US009210962B2

(12) United States Patent
Ho (10) Patent No.: US 9,210,962 B2
(45) Date of Patent: Dec. 15, 2015

(54) REINFORCEMENT STRUCTURE OF SAFETY HELMET AND MANUFACTURING METHOD THEREOF

(71) Applicant: Chang-Hsien Ho, Taoyuan County (TW)

(72) Inventor: Chang-Hsien Ho, Taoyuan County (TW)

( * ) Notice: Subject to any disclaimer, the term of this patent is extended or adjusted under 35 U.S.C. 154(b) by 2 days.

(21) Appl. No.: 14/048,134

(22) Filed: Oct. 8, 2013

(65) Prior Publication Data
US 2015/0059063 A1    Mar. 5, 2015

(30) Foreign Application Priority Data

Aug. 30, 2013   (TW) .............................. 102131224 A (51) Int. Cl.
*A42B 3/12* (2006.01)
*B32B 37/14* (2006.01)
*A42C 2/00* (2006.01)

(52) U.S. Cl.
CPC .................. *A42B 3/124* (2013.01); *A42B 3/125* (2013.01); *A42C 2/002* (2013.01); *B32B 37/144* (2013.01)

(58) Field of Classification Search
CPC .......... A42B 3/00; A42B 3/04; A42B 3/0493; A42B 3/06; A42B 3/063; A42B 3/10; A42B 3/12; A42B 3/124; A42B 3/125; A42B 3/128; A42B 1/08; B32B 2437/04

USPC ....................................... 2/411, 412, 414, 425
See application file for complete search history.

(56) References Cited

U.S. PATENT DOCUMENTS

| | | | | |
|---|---|---|---|---|
| 5,119,516 A | * | 6/1992 | Broersma | 2/411 |
| 5,269,025 A | * | 12/1993 | Broersma | 2/411 |
| 5,477,563 A | * | 12/1995 | Gentes et al. | 2/411 |
| 5,619,756 A | * | 4/1997 | Garneau | 2/425 |
| 6,292,952 B1 | * | 9/2001 | Watters et al. | 2/411 |
| 2010/0281603 A1 | * | 11/2010 | Ho | 2/411 |

* cited by examiner

*Primary Examiner* — Andrew W Collins
(74) *Attorney, Agent, or Firm* — Rosenberg, Klein & Lee (57) ABSTRACT

A reinforcement structure of safety helmet and a manufacturing method thereof. The reinforcement structure includes a helmet body formed of a cushion foam material; and a structure body integrated with the helmet body. The structure body is a texture at least composed of multiple strip members arranged in an array. The structure body is formed with a substantially cellular structure. The helmet body is defined with a top section and a peripheral section and the structure body is defined with a first section and a second section connected to the first section corresponding to the top section and peripheral section of the helmet body. The cushion foam material is injected into a molding module to enclose the first and second sections to form an integrated complex reinforcement structure, which is easier to manufacture and has higher structural strength, lighter weight and higher security.

17 Claims, 11 Drawing Sheets

REINFORCEMENT STRUCTURE OF SAFETY HELMET AND MANUFACTURING METHOD THEREOF

BACKGROUND OF THE INVENTION

1. Field of the Invention

The present invention relates generally to a reinforcement structure of safety helmet and a manufacturing method thereof. In the manufacturing method of the reinforcement structure, a cushion (foam) material is injected into a molding module to form a helmet body enclosing a helmet-shaped structure body. The helmet body and the structure body are combined to form an integrated complex reinforcement structure as a helmet assembly, which is easier to manufacture and has higher structural strength, lighter weight and higher security.

2. Description of the Related Art

A conventional safety helmet is manufactured in such a manner that a plastic shell is fixed in a vacuum molding device and a foam material is injected into the molding device and heated to form an anti-impact filling body tightly enclosed by the plastic shell to achieve the safety helmet. For example, U.S. Pat. No. 4,466,138 discloses a safety helmet with a shell injected from thermoplastics and method for the manufacture of said helmet. Another prior art discloses a manufacturing method of a safety helmet.

The external plastic shell of the conventional safety helmet serves to resist against the impact and thrust force of a sharp article. Moreover, the plastic shell encloses and holds the foam filling body, which is relatively crackly. Accordingly, when impacted by a strong external force, the plastic shell can buffer the impact force and avoid breakage of the foam filling body so as to ensure safety.

In the conventional foam cushion material, each foam filling body is a closed structure body. During the heating process, the borders of the adjacent foam particles are restricted by the mold to irregularly tightly attach to and bond with each other. When impacted by an external obtuse force, the irregularly tightly bonded foam particles can absorb the impact force and spread the impact force in all directions. However, when the foam filling body is severely impacted by a sharp object, the sharp impact force is likely to act on the borders of the foam particles to separate the borders from each other and break the foam filling body apart. Under such circumstance, the anti-impact performance and buffering effect of the foam particles are deteriorated and it is impossible for the foam particles to effectively uniformly spread the impact force to the respective parts of the helmet body (or the foam filling body).

Especially, when the conventional helmet structure bears a lateral impact or pressure, the lateral action force or pressure will create a bending shear force applied to the helmet body. The bending shear force will damage the helmet body, which is simply enclosed in the plastic shell on single side. As a result, a wearer's head can be hardly perfectly protected.

Therefore, in the prior art, the external plastic shell is strengthened (thickened) to increase the resistant force against the impact of the sharp object and the lateral impact. The plastic shell also encloses and holds the cushion foam material (or the foam filling body) to prevent the cushion foam material from breaking under impact. However, when the thickness and weight of the plastic shell and/or the cushion foam material are continuously increased under high security requirement, the thickness and volume of the entire safety helmet are increased to increase the load on a wearer.

In order to overcome the above problem, an improved helmet has been developed. In this helmet, a layer or multiple layers of fiber to help in reinforcing the foam filling body against the impact of sharp objects. However, as well known by those who are skilled in this field, it is relatively troublesome and unstable to manufacture such helmet. Moreover, the fiber layer also will lead to increase of the total weight of the helmet (including the helmet body). Furthermore, the fiber layer structure lacks in self-support ability. As a result, in the case that a heavy pressure (especially a lateral pressure) or an impact force in different form is applied to the helmet, the helmet can hardly bear the impact.

According to the above, even with the fiber layer, the conventional helmet still fails to have sufficient strength against an impact force in different form. Therefore, the helmet can hardly protect a wearer from lateral impact. In the case that the security is enhanced simply by means of thickening the plastic shell or the foam filling body, the volume and weight of the entire safety helmet will be inevitably increased to increase the load on a wearer. This is not what we expect.

In tests and practical use, it is found that the conventional safety helmet structure has some problems. It is necessary to redesign the assembling structure of the external plastic shell and the internal foam filling body so as to enhance the structural strength of the helmet and increase the security thereof. Moreover, it is necessary to facilitate the manufacturing process of the conventional safety helmet and change the transmission force of the external impact force (or external action force) to increase the support ability thereof for providing full protection for a wearer.

For example, the external impact force can be uniformly spread to the respective parts of the entire helmet body through the internal structure body (or the foam filling body). In this case, the structure body can uniformly bear different forms of impact. Also, it is necessary to thin the external plastic shell or remove the fiber layer so that the helmet body can have higher structural strength in all directions or sections. In this case, the safety helmet can fully bear the external impact or lateral impact pressure. Moreover, the weight of the helmet can be reduced without deteriorating the security. This widens the application range of the safety helmet.

SUMMARY OF THE INVENTION

It is therefore a primary object of the present invention to provide a reinforcement structure of safety helmet and a manufacturing method thereof to overcome the shortcomings of the conventional safety helmet that the structural strength is low, it is uneasy to manufacture the helmet and the ratio of defective products is high. The reinforcement structure of safety helmet includes a helmet body formed of a cushion (foam) material; and a structure body integrated with the helmet body. The structure body is a substantially semispherical texture in the form of a helmet at least composed of multiple strip members arranged in an array. The helmet body is defined with a top section and a peripheral section and the structure body is defined with a first section and a second section connected to the first section corresponding to the top section and peripheral section of the helmet body.

It is a further object of the present invention to provide the above reinforcement structure of safety helmet and the manufacturing method thereof. In manufacturing, the cushion foam material is injected into a mold or a molding module to enclose and bond with the texture of the structure body to form an integrated complex reinforcement structure. The reinforcement structure is able to bear different forms of impact to enhance the security without increasing the thickness of the external plastic shell and without using any fiber layer. Therefore, the total weight of the safety helmet is reduced.

In the reinforcement structure of safety helmet, the cushion (foam) material is passed through or filled into the meshes of the texture of the structure body to enclose and bond with the strip members of the structure body.

In the above reinforcement structure of safety helmet, the lower edges of the second section are connected with each other to form a subsidiary section having a U-shaped cross section to help in increasing the support effect and structural strength of the second section against lateral impact or pressure. After the cushion foam material is injected into the mold to form the helmet body enclosing and bonding with the structure body, the cushion foam material is filled in the subsidiary section, whereby the bottom of the helmet body is enclosed in the subsidiary section to form an integrated structure for fully spreading the impact force.

In the above reinforcement structure of safety helmet, the first section and/or the second section of the structure body are partially or fully formed with a texture similar to a cellular structure. Moreover, the first section or the second section of the structure body is partially or fully provided with a subsidiary cellular structure as an impact collapsible section. The cellular structure and the subsidiary cellular structure have multiple solid cells with a geometrical configuration. The cushion foam material is filled into the solid cells to enclose and bond with the structure body to form an integrated reinforcement impact absorption structure. That is, the helmet body formed of the cushion (foam) material, the structure body and the subsidiary cellular structure (and/or the plastic shell) together form a multi-buffering and impact absorption system to uniformly spread and transmit the external impact force.

In the above reinforcement structure of safety helmet, the structure body is positioned on an innermost face of the helmet assembly or the helmet body as an innermost layer thereof. The helmet body formed of the cushion (foam) material is restricted between the plastic shell and the structure body. This prevents the helmet body from breaking apart when the helmet assembly is impacted by an external sharp article. Moreover, after the plastic shell and the helmet body provide a preliminary buffering and impact absorption effect, the originally concentrated external impact force is uniformly distributed over the structure body. Therefore, the structure body and/or the subsidiary cellular structure form an impact collapsible section to ensure that the structure keeps unbroken so as to fully protect the wearer's head.

The manufacturing method of the reinforcement structure of safety helmet of the present invention includes steps of:
(a) providing a (full-face) structure body disposed in a molding module (or a mold), the molding module including a female mold and a male mold, the female mold and the male mold defining therebetween a helmet-shaped cavity in which the structure body is disposed, the structure body being a substantially semispherical texture in the form of a helmet, the structure body being at least composed of multiple strip members arranged in an array, the structure body being defined with a first section and a second section connected to the first section;
(b) injecting a cushion (foam) material into the cavity to integrally form a helmet body enclosing the structure body or bonding with the structure body, the helmet body being defined with a top section and a peripheral section corresponding to the first and second sections of the structure body;

(b1) thermally pressing and foaming the cushion (foam) material (or the helmet body) to bond with the strip members of the structure body, whereby the helmet body and the structure body are integrated into a complex reinforcement structure defined as a subassembly; and
(c) providing a plastic shell to enclose and assemble with the subassembly to together form a helmet assembly.

Alternatively, the manufacturing method of the reinforcement structure of safety helmet of the present invention includes steps of:
(a) providing a (full-face) structure body and a helmet body formed of cushion (foam) material together disposed in a molding module (or a mold), the molding module including a female mold and a male mold, the female mold and the male mold defining therebetween a helmet-shaped cavity in which the structure body and the helmet body are disposed, the structure body being a substantially spherical texture at least composed of multiple strip members arranged in an array, the structure body being defined with a first section and a second section connected to the first section, the helmet body being defined with a top section and a peripheral section corresponding to the first and second sections of the structure body; and
(b) thermally pressing the cushion (foam) material (or the helmet body) to integrate the helmet body and the structure body with each other to form an integrated complex reinforcement structure defined as a subassembly;
(c) providing a plastic shell to enclose and assemble with the subassembly to together form a helmet assembly.

Still alternatively, the manufacturing method of the reinforcement structure of safety helmet of the present invention includes steps of:
(a) providing a structure body and a plastic shell disposed in a molding module (or a mold), the molding module including a female mold and a male mold, the female mold and the male mold defining therebetween a helmet-shaped cavity in which the structure body and the plastic shell are disposed; and
(b) injecting a cushion (foam) material into the cavity and thermally pressing the cushion (foam) material to form a helmet body enclosing the structure body and connecting with the plastic shell to form an integrated complex reinforcement structure as a helmet assembly.

The present invention can be best understood through the following description and accompanying drawings, wherein:

DETAILED DESCRIPTION OF THE PREFERRED EMBODIMENTS

Figure 1:
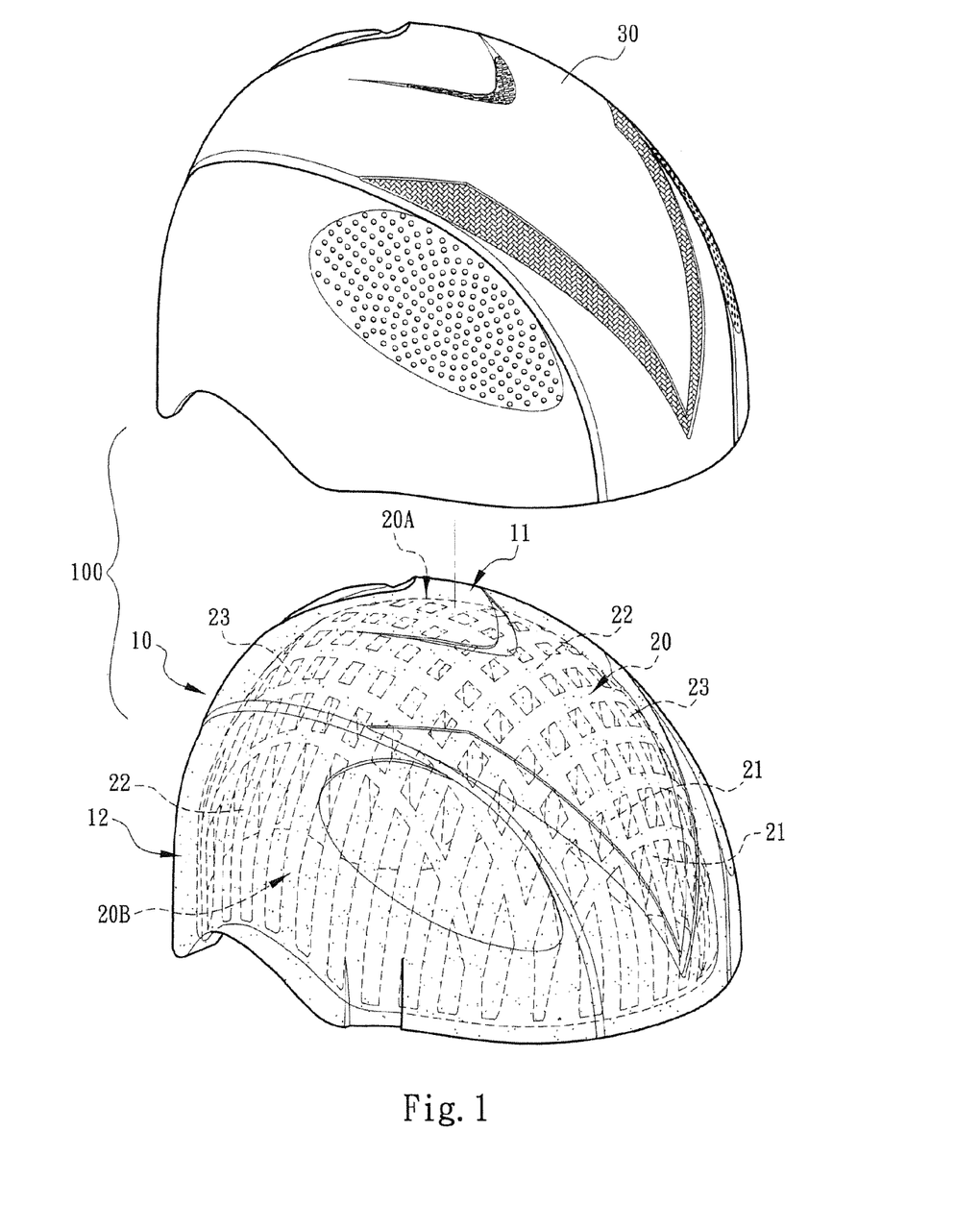
FIG. 1 is a perspective view of the safety helmet of the present invention, showing the positional relationship between the helmet body, the structure body and the plastic shell.
Figure 2:
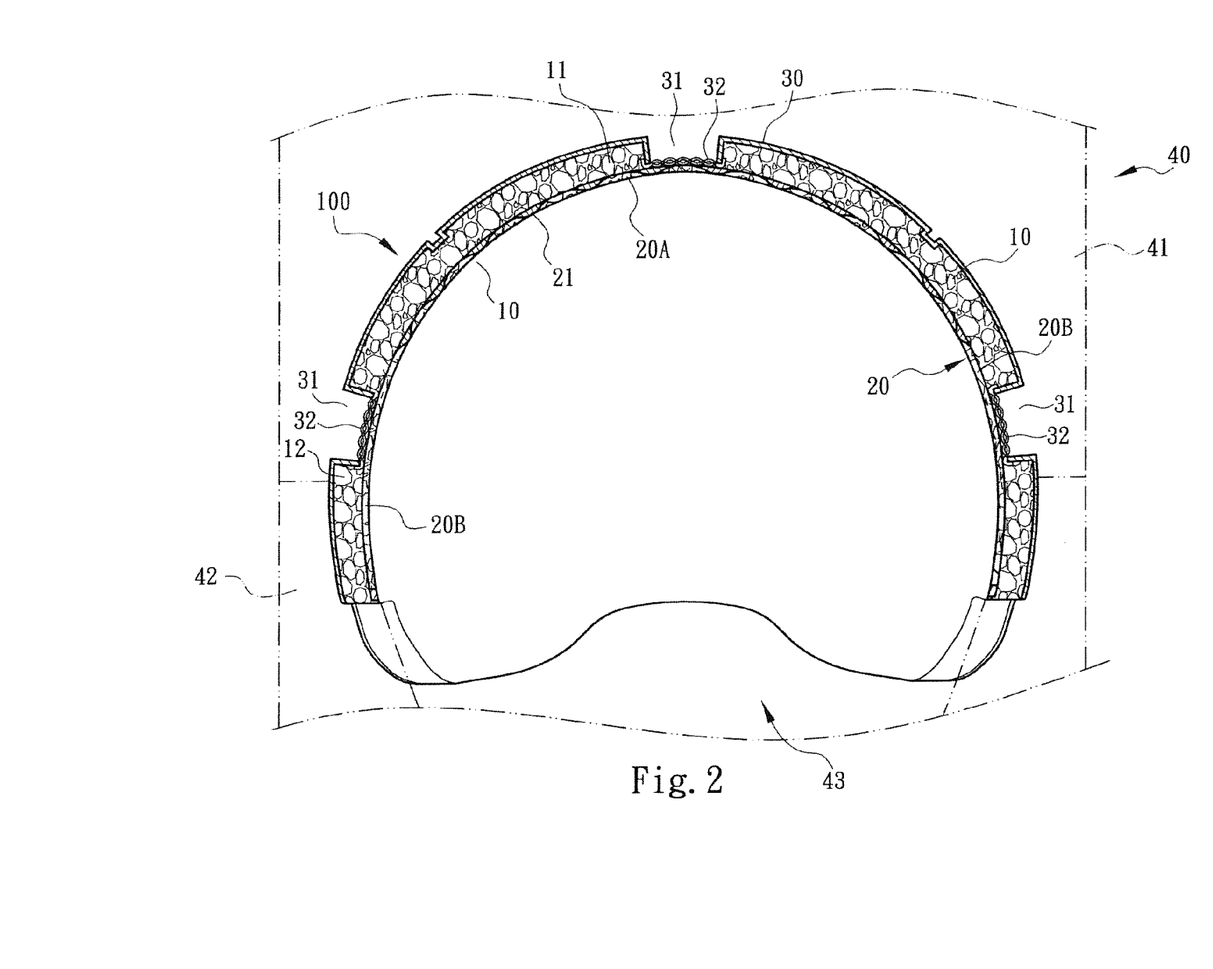
FIG. 2 is a sectional view according to FIG. 1, showing the assembly of the helmet body, the structure body and the plastic shell, in which the phantom lines show the molding module.

Please refer to FIGS. 1 and 2. In this embodiment, the reinforcement structure of safety helmet of the present invention is a safety helmet for sports. Alternatively, the safety helmet can be an engineering helmet, a mountaineering helmet, a horse riding helmet, a bicycle helmet, a motorcycle helmet, a skiing helmet or the like in a half-face form (as shown in FIGS. 1 to 8) or a full-face form (as shown in FIG. 9). The safety helmet includes a helmet body 10 formed of a cushion (foam) material and a structure body 20, which together form a subassembly. The cushion (foam) material is injected into a mold or a molding module 40 to form the helmet body 10. The helmet body 10 is defined with a top section 11 and a peripheral section 12.

Basically, the molding module 40 includes a female mold 41, a male mold 42 and a helmet-shaped cavity 43 defined between the female mold 41 and the male mold 42. The cavity 43 serves as a space in which the structure body 20 and/or the plastic shell 30 are received and the cushion (foam) material is injected to form the helmet body 10. Referring to FIG. 2, the plastic shell 30 is formed with vents 31 in which mesh textures 32 are disposed for preventing alien sharp articles from thrusting into the helmet body 10.

As shown in FIGS. 1 and 2, the structure body 20 is selectively made of high-elasticity material such as plastic material or the like. The structure body 20 is a substantially semi-spherical body of mesh texture in the form of a helmet. The structure body 20 is a texture at least composed of multiple strip members 21, 22 arranged in an array. The strip members 21, 22 define therebetween multiple geometrical meshes 23. For illustration purposes, in this embodiment, the strip members are defined as longitudinal strip members 21 and transverse strip members 22. The longitudinal strip members 21 and transverse strip members 22 can be arranged at equal intervals to form square or rectangular meshes 23.

That is, according to the form or specification of the safety helmet, the arrangement density of the longitudinal strip members 21 and transverse strip members 22 and the shape (configuration) of the meshes 23 can be modified or changed.

In this embodiment, the structure body 20 is defined with a first section 20A and a second section 20B connected to the first section 20A corresponding to the top section 11 and peripheral section 12 of the helmet body 10. By means of the molding module 40, the cushion (foam) material (or the helmet body 10) passes through the meshes 23 to enclose (bond with) the first and second sections 20A and 20B to form an integrated reinforcement structure (or a complex reinforcement structure in the form of a helmet). The integrated reinforcement structure (the combination of the helmet body 10 and the structure body 20) is defined as the subassembly. The plastic shell 30 encloses the subassembly to together form a helmet assembly 100.

It should be noted that the cushion (foam) material (or the helmet body 10) passes through the meshes 23 to enclose the first and second sections 20A and 20B to form an integrated complex reinforcement structure in the form of a helmet.

To speak more specifically, when impacted by an external force, especially with respect to the lateral side or the peripheral section of the helmet body, the foam cushion material can directly resist against and buffer the external impact. Moreover, the cushion foam material (or the helmet body 10) tightly encloses the strip members 21, 22 and the meshes 23 of the structure body 20 to form a complex structure. This greatly increases the bonding force between the borders of the foam particles and minimizes the possibility of decomposition and breakage that take place in the prior art.

Also, the external impact force is directly fully transmitted and spread over the entire helmet body 10 (or the foam filling body) through the longitudinal and transverse strip members 21, 22 of the structure body 20. Therefore, the respective parts of the helmet body 10 will uniformly bear the components of the external impact force. In this case, the possibility of breakage of the helmet body 10 due to concentration of force is minimized.

That is, the integrated complex texture composed of the helmet body 10 and the structure body 20 is an excellent reinforcement structure, which can change the transmission form of the external impact force and achieve highly reinforcing effect to enhance safety. In contrast, when the conventional helmet body simply formed of the cushion foam material is impacted by an alien article, (especially with respect to the lateral side or the peripheral section of the helmet body), the helmet body is very likely to break apart along the bonding borders of the foam particles to deteriorate or even lose its buffering effect. Also, the conventional helmet body can hardly uniformly transmit the impact force to the respective parts of the helmet body (or the foam filling body). As a result, the impact force cannot be spread over the conventional helmet body.

In comparison with the prior art, the helmet body 10 (or the subassembly) has a reinforcement structure that can bear greater obtuse impact force. In addition, the structure body 20 directly increases the bonding force between the borders of the foam particles, whereby the helmet body obviously can bear greater impact of sharp article. Under such circumstance, the amount or thickness of the cushion foam material, the external plastic shell or fiber layer can be minified to greatly reduce the volume and weight of the entire helmet assembly 100 (or subassembly). In this case, the load on a wearer is apparently reduced.

This is because the structure body 20 increases the structural strength of the cushion (foam) material (or the helmet body 10) to fully bear different forms of greater external forward impact and pressure (coming from the top section of the helmet body) or lateral impact and pressure (coming from the lateral side of the helmet body). Therefore, the additional material of the conventional helmet for increasing the structural strength or resistance can be minimized, thinned or saved.

Figure 3:
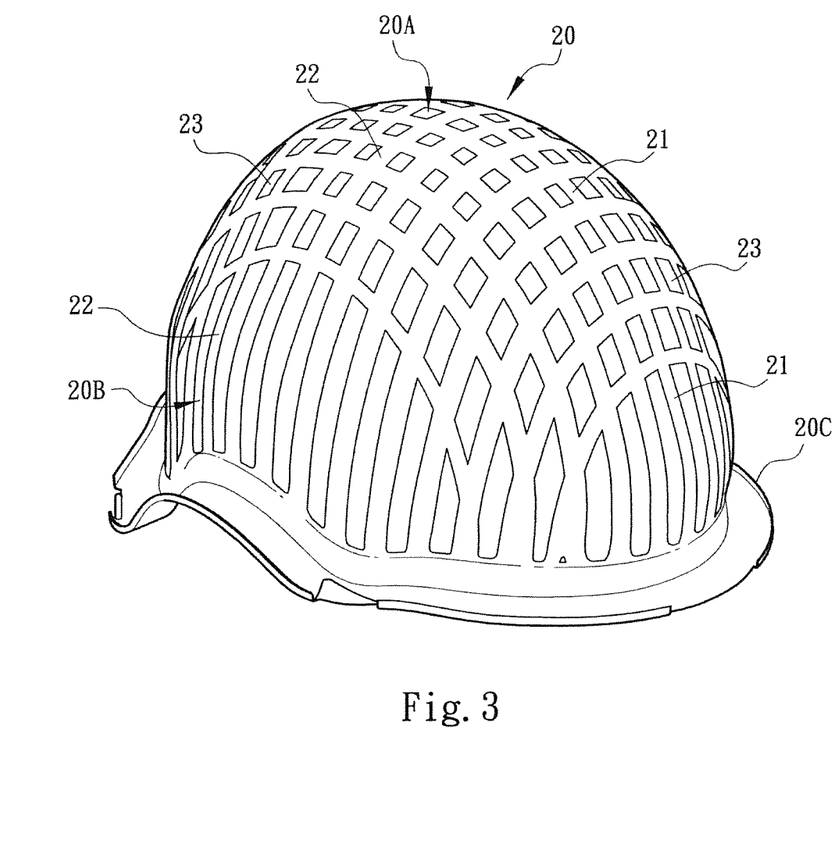
FIG. 3 is a perspective view of the structure body of the present invention in another aspect, showing that the bottom section of the structure body is integrally formed with a subsidiary section.

Please refer to FIG. 3. In this embodiment, the lower edges of the second section 20B are connected with each other to form an annular subsidiary section 20C having a U-shaped cross section to help in increasing the support effect and structural strength of the second section 20B. Moreover, the subsidiary section 20C of the structure body 20 also serves to fix or locate the structure body 20 in the cavity 43 of the molding module.

It should be noted that the lower edges of the second section 20B are connected with each other to form an annular subsidiary section 20C to increase the structural strength of the integrated structure body 20 and achieve better force transmission and external force bearing effect. Especially, with the subsidiary section 20C, the structure body 20 has higher support or load strength to lateral impact pressure than the conventional structure. Moreover, when the cushion (foam) material is injected into the molding module 40 to form the helmet 10 enclosing the structure body 20, the cushion (foam) material is filled into the subsidiary section 20C, whereby the bottom of the cushion (foam) material is enclosed in the subsidiary section 20C to form a fully integrated complex reinforcement structure.

Figure 4:
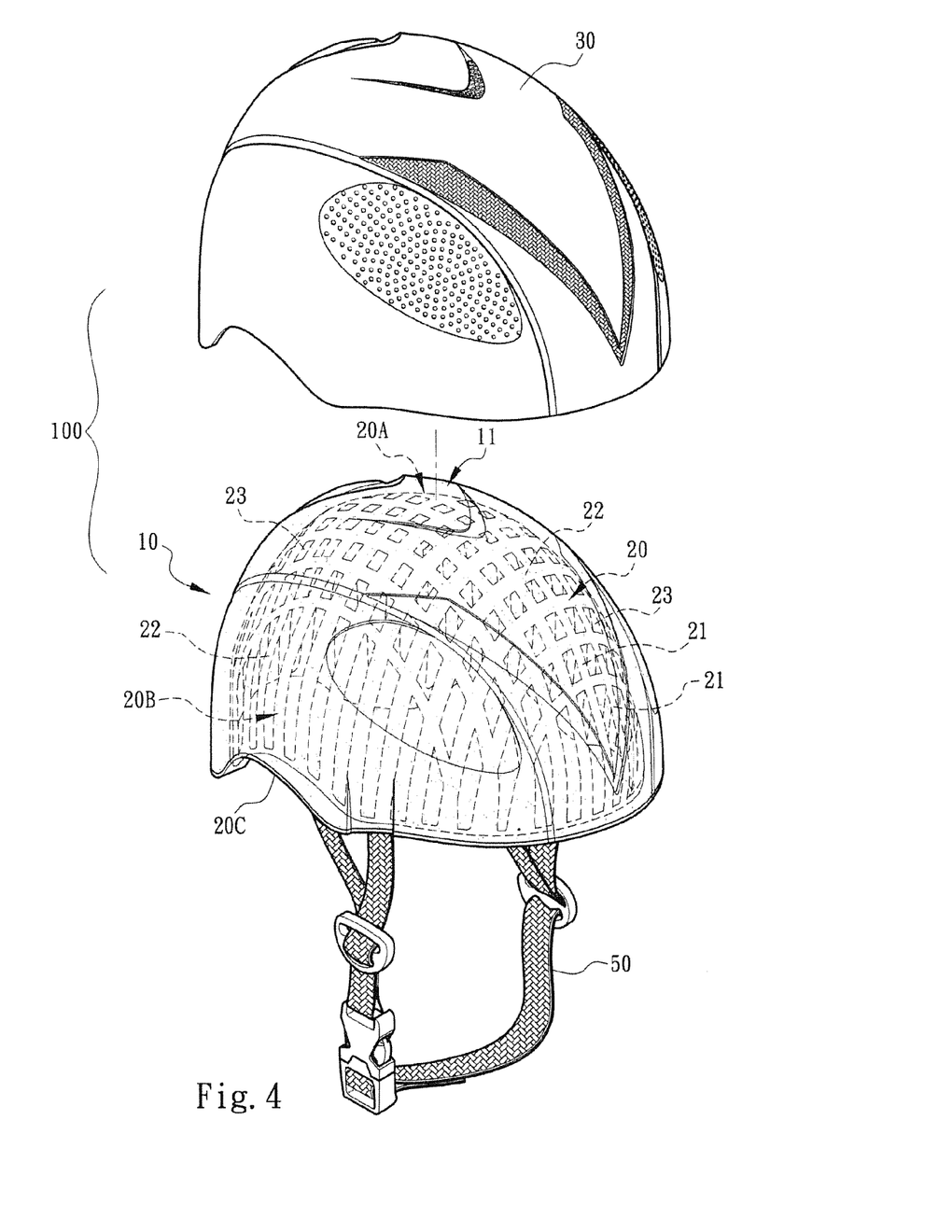
FIG. 4 is a perspective view another embodiment of the present invention, showing that a fastening strap or a fastening device is disposed on the subsidiary section.

In a preferred embodiment, fastening strap or fastening device 50 can be directly disposed on the subsidiary section 20C as shown in FIG. 4. In this case, it is no more necessary to additionally mount a U-shaped bottom frame on the helmet body for assembling with the fastening device as in the conventional safety helmet.

Figure 5:
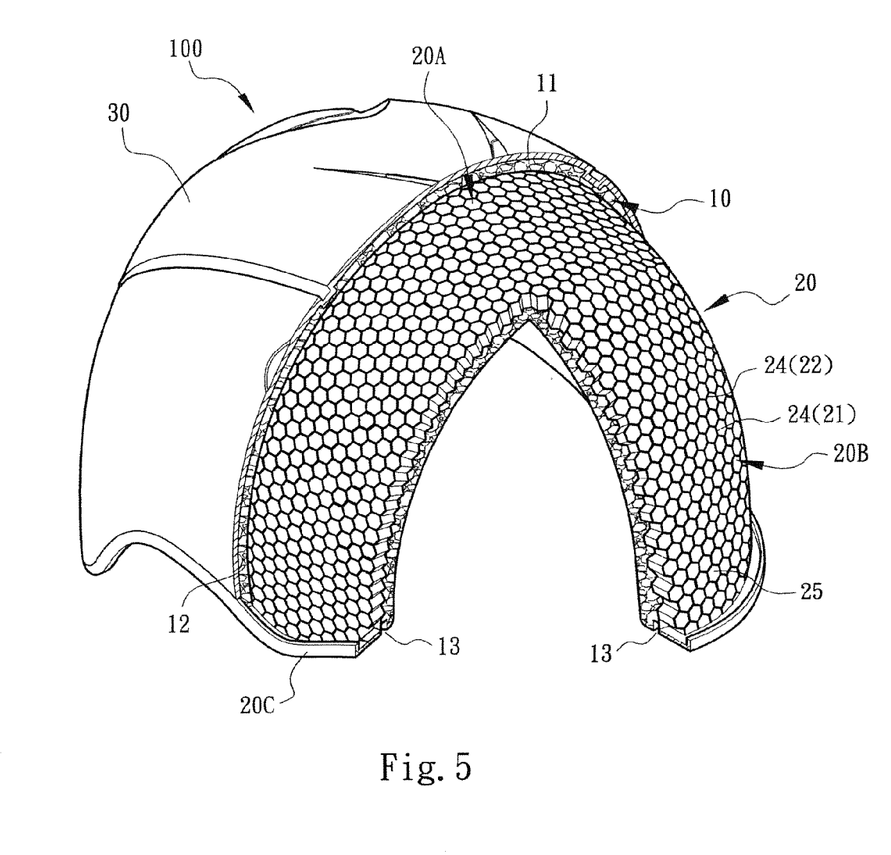
FIG. 5 is a perspective view another embodiment of the safety helmet of the present invention, showing that the structure body is formed with a cellular structure with multiple walls and solid cells and the structure body is integrated with the helmet body and the plastic shell.
Figure 6:
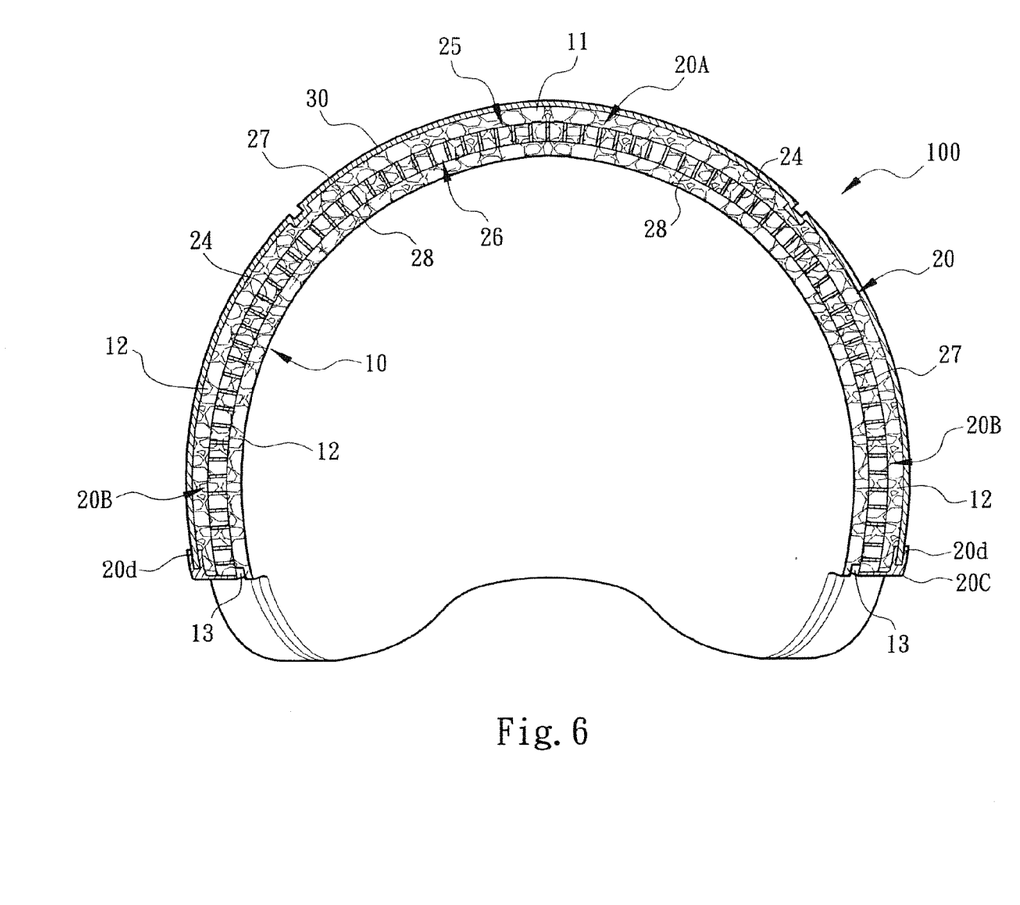
FIG. 6 is a sectional view according to FIG. 5, showing the assembly of the helmet body, the structure body and the plastic shell.

Please refer to FIGS. 5 and 6. In a preferred embodiment, the structure body 20 includes multiple walls 24 (formed of longitudinal and transverse strip members 21, 22 similar to the above strip members). Each wall 24 has a height of about 0.1 mm~0.8 mm. The walls 24 are connected with each other to form a cellular structure. The walls 24 define multiple solid cells 25 with a geometrical configuration in adjacency to each other. The solid cells 25 have a depth equal to the height of the walls 24 (about 0.1 mm~0.8 mm) to form a collapsible structure. Also, the cushion (foam) material can be filled into the cells 25 to enclose the structure body 20 to form a complex collapsible reinforcement structure.

Figure 7:
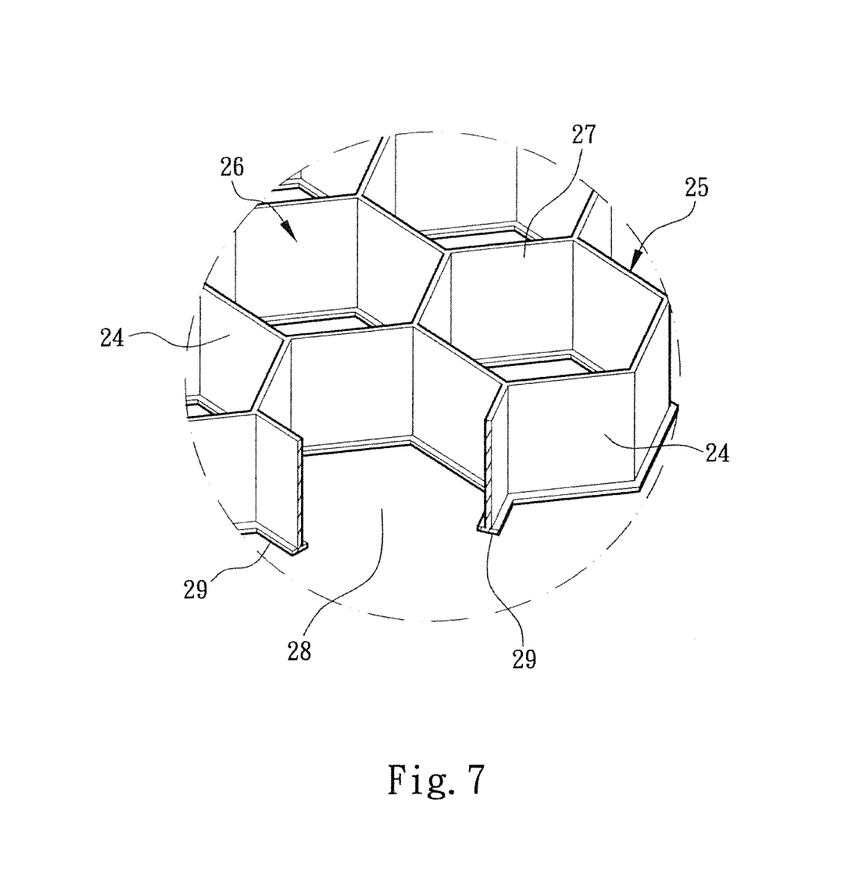
FIG. 7 is a perspective view of the structure body of the present invention in another aspect, showing that the solid cell defined by the walls includes a chamber and two openings and an extension section extends from the lower end of the walls.
Figure 8:
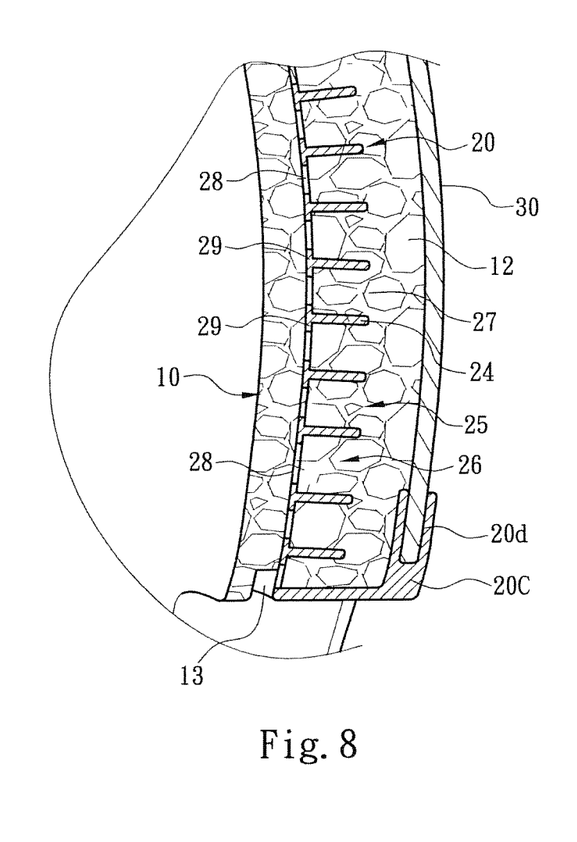
FIG. 8 is a sectional view of a part of another embodiment of the present invention, showing the connection between the structure body and the helmet body.
Figure 9:
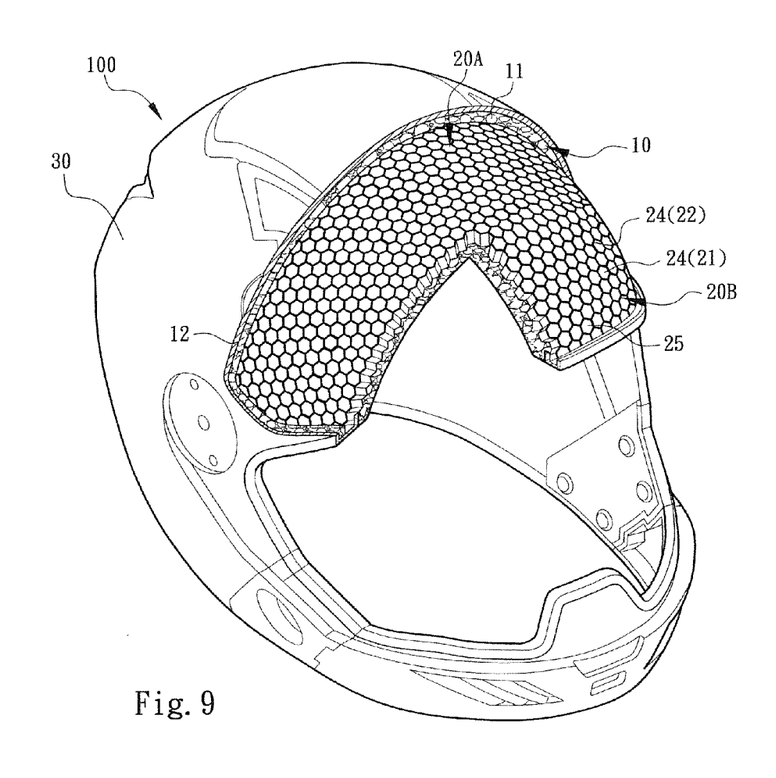
FIG. 9 is a perspective view of the safety helmet of the present invention in a full-face form.

Please refer to FIGS. 6, 7 and 8. The solid cell 25 includes a chamber 26 defined by the walls 24 and two openings 27, 28 formed at two ends of the walls 24 (or the chamber 26), that is, the upper and lower ends of the chamber 26. It should be noted that the solid cell 25 (or the chamber 26) has a geometrical configuration such as circular shape, triangular shape, square shape, rectangular shape or hexagonal shape.

The lower edges of the second section 20B are connected with each other to form the subsidiary section 20C. The subsidiary section 20C is formed with insertion groove 20d in which a bottom edge of the plastic shell 30 is held.

Please refer to FIGS. 7 and 8, which show a modified embodiment of the solid cell 25. At least one end of the wall 24 (the lower end of the wall 24 in the drawings) has an extension section 29 extending to two sides, whereby the wall 24 is formed with a T-shaped or reverse T-shaped cross section. Accordingly, two ends of the solid cell 25 have different strengths. That is, the extension section 29 makes the impact bearing ability of the wall 24 gradually increase from upper end to lower end. Therefore, in comparison with the impact bearing ability of the upper end of the wall 24, the lower end of the wall 24 has greater impact bearing ability. In this case, the structure body 20 is cumulatively collapsible under external impact force.

Please now refer to FIGS. 6 and 8. In another modified embodiment, a recess 13 is formed between an inner side of lower section of the structure body 20, (that is, the inner side of the subsidiary section 20C) and the helmet body 10. To speak more specifically, the recess 13 is formed at the lower end section of the helmet body 10 for mounting a protective strip or decorative strip (not shown) therein.

FIG. 9 shows that the helmet body 10, the cellular structure body 20 and the plastic shell 30 are assembled to form a full-face safety helmet.

Figure 10:
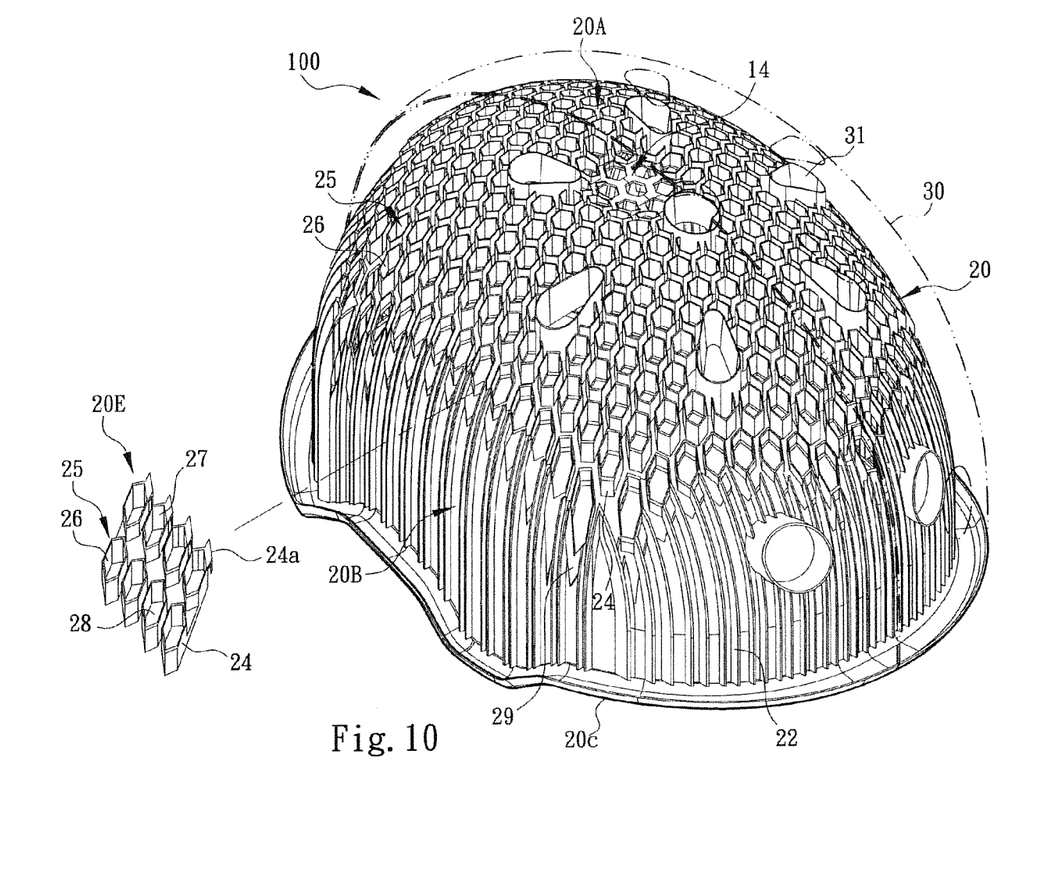
FIG. 10 is a perspective view of another embodiment of the present invention, showing the structure body and the subsidiary cellular structure.
Figure 11:
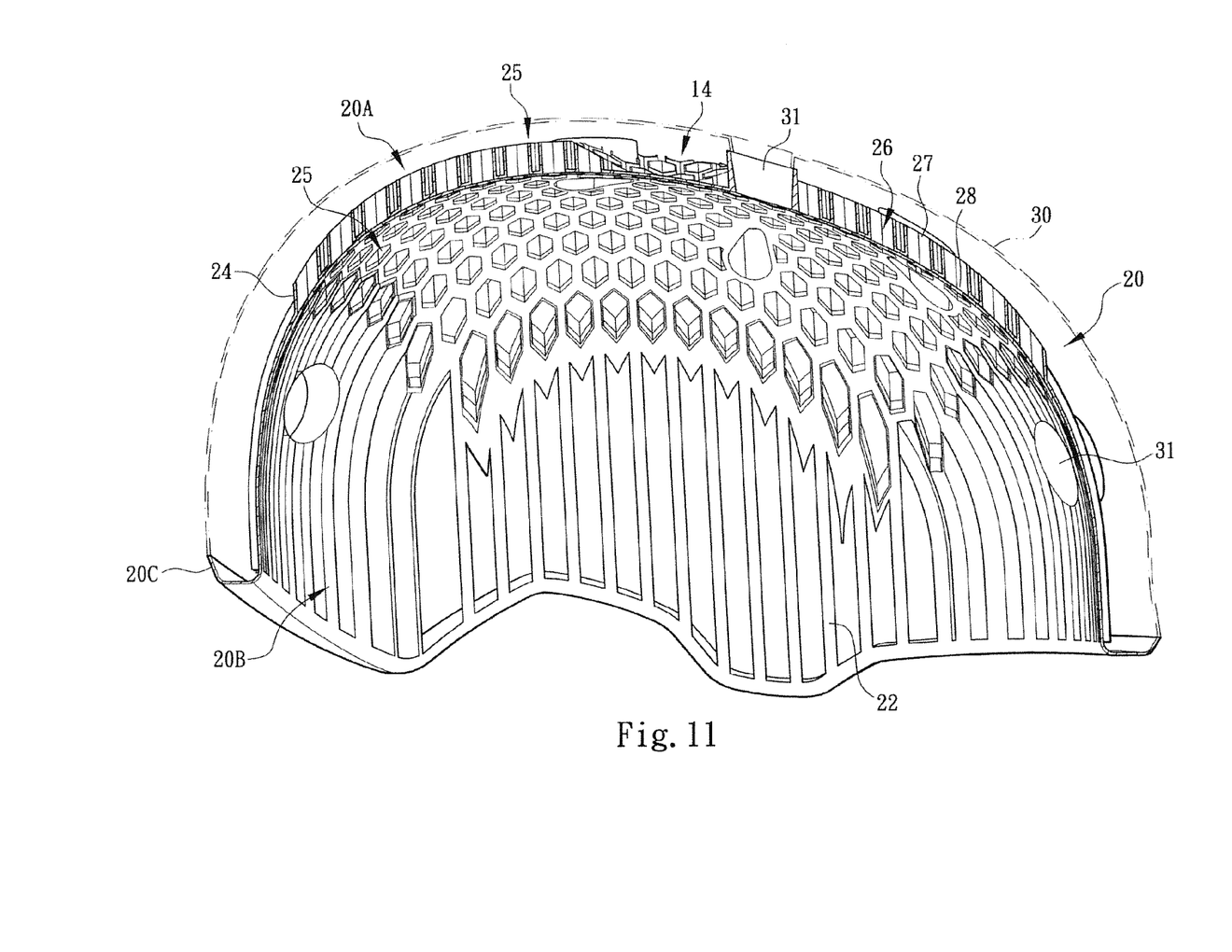
FIG. 11 is a sectional view of the present invention, showing the assembly of the plastic shell, the helmet body and the structure body and showing that the structure body is the innermost layer of the helmet assembly.

Please refer to FIGS. 10 and 11. In this embodiment, the first section 20A and/or the second section 20B of the structure body 20 are partially or fully formed with a texture similar to a cellular structure. In the drawings, the first section 20A is formed with a cellular structure, while the second section 20B is formed with a texture of strip members 21 or 22 arranged in an array. In this embodiment, the strip members 21 or 22 of the second section 20B form a structure with a U-shaped cross section, which is connected to the walls 24 of the cellular structure of the first section 20A.

In a modified embodiment, the second section 20B is assembled with a subsidiary cellular structure 20E to form an impact collapsible section so as to increase the structural strength of the second section 20B against lateral impact pressure.

It should be noted that the second section 20B of the structure body 20 is selectively partially or fully provided with the subsidiary cellular structure 20E. The subsidiary cellular structure 20E includes multiple walls 24 and multiple solid cells 25 with geometrical configuration. The wall 24 of the subsidiary cellular structure 20E has an extension wall 24a for assembling or inserting with the wall 24 of the cellular structure of the first section 20A. The cushion (foam) material can be filled into the solid cells 25 to bond with and enclose the structure body 20 and/or the subsidiary cellular structure 20E to form an integrated reinforcement impact absorption structure.

That is, the helmet body 10 formed of the cushion (foam) material, the structure body 20 or the subsidiary cellular structure 20E (and/or the plastic shell 30) together form a multi-buffering and impact absorption system to uniformly spread and transmit the external impact force.

In a modified embodiment, the top section 11 of the helmet body 10 is formed with a dent 14 in which an elastic cushion pad (not shown) is disposed. The elastic cushion pad is a block body positioned between the plastic shell 30 and the helmet body 10. The elastic cushion pad has an elastic coefficient smaller than that of the cushion (foam) material. The elastic cushion pad serves to help the helmet body 10 to absorb external impact force and make a wearer more comfortable.

Please refer to FIG. 11 (or 2). In a preferred embodiment, the structure body 20 is positioned on an innermost face of the helmet assembly 100 or the helmet body 10 as an innermost layer thereof. The helmet body 10 formed of the cushion (foam) material is restricted between the plastic shell 30 and the structure body 20. This prevents the helmet body 10 from breaking apart when the helmet assembly 100 is impacted by an external sharp article. Moreover, after the plastic shell 30 and the helmet body 10 provide a preliminary buffering and impact absorption effect, the external impact force is uniformly distributed over the structure body 20 and/or the subsidiary cellular structure 20E. Therefore, the structure body 20 and/or the subsidiary cellular structure 20E form an impact collapsible section to ensure that the structure keeps unbroken so as to fully protect the wearer's head.

The manufacturing method of the reinforcement structure of safety helmet of the present invention includes steps of:

(a) providing a structure body 20 disposed in a molding module 40 (or a mold), the molding module 40 including a female mold 41 and a male mold 42, the female mold 41 and the male mold 42 defining therebetween a helmet-shaped cavity 43 in which at least the structure body 20 is disposed, a plastic shell 30 being also disposed in the cavity 43, the structure body 20 being defined with a first section 20A, a second section 20B connected to the first section 20A and a subsidiary section 20C connected to a lower edge of the second section 20B;

(b) injecting a cushion (foam) material into the cavity 43 to integrally form a helmet body 10 enclosing the structure body 20 or connecting with the plastic shell 30, the cushion (foam) material being filled into the subsidiary section 20C, whereby a bottom section of the cushion (foam) material (or the helmet body 10) is enclosed in the subsidiary section 20C, the helmet body 10 being defined with a top section 11 and a peripheral section 12, the helmet body 10 and the structure body 20 being integrated with each other to form a reinforcement structure defined as a subassembly;

(b1) thermally pressing the cushion (foam) material (or the helmet body 10) and the structure body 20 (and the plastic shell 30) to integrate the helmet body 10, the structure body 20 and the plastic shell 30 into a complex reinforcement structure; and (c) providing a plastic shell 30 to enclose and assemble with the subassembly to together form a helmet assembly 100.

In a modified embodiment, the manufacturing method of the reinforcement structure of safety helmet of the present invention includes steps of:

(a) providing a structure body 20 and/or a plastic shell 30 disposed in a molding module 40, the molding module 40 including a female mold 41 and a male mold 42, the female mold 41 and the male mold 42 defining therebetween a helmet-shaped cavity 43 in which at least the structure body 20 and/or the plastic shell 30 are disposed, the structure body 20 being defined with a first section 20A, a second section 20B connected to the first section 20A and a subsidiary section 20C connected to a lower edge of the second section 20B; and (b) injecting a cushion (foam) material into the cavity 43 to integrally form a helmet body 10 and thermally pressing the cushion (foam) material (or the helmet body 10) to enclose the structure body 20 and connect with the plastic shell 30 to form an integrated complex reinforcement structure, the cushion (foam) material being also filled into the subsidiary section 20C, whereby a bottom section of the cushion (foam) material (or the helmet body 10) is enclosed in the subsidiary section 20C, the helmet body 10 being defined with a top section 11 and a peripheral section 12 corresponding to the first and second sections 20A, 20B of the structure body 20.

In a preferred embodiment, the manufacturing method of the reinforcement structure of safety helmet of the present invention includes steps of:

(a) providing a structure body 20 and a helmet body 10 formed of cushion (foam) material together disposed in a molding module 40, the molding module 40 including a female mold 41 and a male mold 42, the female mold 41 and the male mold 42 defining therebetween a helmet-shaped cavity 43 in which the structure body 20 and the helmet body 10 are disposed, the structure body 20 being a substantially spherical texture at least composed of multiple strip members 21 or 22 arranged in an array, the structure body 20 being defined with a first section 20A, a second section 20B connected to the first section 20A and a subsidiary section 20C connected to the second section 20B, the helmet body 10 being defined with a top section 11 and a peripheral section 12 corresponding to the first and second sections 20A, 20B of the structure body 20; and (b) thermally pressing the cushion (foam) material (or the helmet body 10) to integrate the helmet body 10 and the structure body 20 with each other to form an integrated complex reinforcement structure defined as a subassembly, a bottom section of the helmet body 10 being enclosed in the subsidiary section 20C;

(c) providing a plastic shell 30 to enclose and assemble with the subassembly to together form a helmet assembly 100.

In step (a), the first section 20A and/or the second section 20B of the structure body 20 are partially or fully formed with a texture similar to a cellular structure. In this embodiment, the first section 20A is formed with a cellular structure, while the second section 20B is formed with a texture of strip members 21 or 22 arranged in an array. The strip members 210122 of the second section 20B form a structure with a U-shaped cross section, which is connected to the walls 24 of the cellular structure of the first section 20A.

In step (a), the second section 20B is assembled with a subsidiary cellular structure 20E to form an impact collapsible section so as to increase the structural strength of the second section 20B against lateral impact pressure.

It should be noted that the second section 20B of the structure body 20 is selectively partially or fully provided with the subsidiary cellular structure 20E. The subsidiary cellular structure 20E includes multiple walls 24 and multiple solid cells 25 with geometrical configuration. The wall 24 of the subsidiary cellular structure 20E has an extension wall 24a for assembling or inserting with the wall 24 of the cellular structure of the first section 20A. The cushion (foam) material can be filled into the solid cells 25 to bond with and enclose the structure body 20 and/or the subsidiary cellular structure 20E to form an integrated reinforcement impact absorption structure.

In step (a), the top section 11 of the helmet body 10 is formed with a dent 14 in which an elastic cushion pad (not shown) is disposed. The elastic cushion pad is a block body positioned between the plastic shell 30 and the helmet body 10. The elastic cushion pad has an elastic coefficient smaller than that of the cushion (foam) material.

In a preferred embodiment, the manufacturing method of the reinforcement structure of safety helmet of the present invention includes steps of:

(a) providing a structure body 20 and a plastic shell 30 disposed in a molding module 40 (or a mold), the molding module 40 including a female mold 41 and a male mold 42, the female mold 41 and the male mold 42 defining therebetween a helmet-shaped cavity 43 in which the structure body 20 and the plastic shell 30 are disposed; and (b) injecting a cushion (foam) material into the cavity 43 and thermally pressing the cushion (foam) material to form a helmet body 10 enclosing the structure body 20 and connecting with the plastic shell 30 to form an integrated complex reinforcement structure as a helmet assembly 100.

It should be noted that the structure body 20 is positioned on an innermost face of the helmet assembly 100 or the helmet body 10 as an innermost layer thereof. The helmet body 10 formed of the cushion (foam) material is restricted between the plastic shell 30 and the structure body 20. When the cushion (foam) material is injected into the cavity 43, the cushion (foam) material forms the helmet body 10 to enclose and connect with the strip members 21, 22 (or the walls 24 and extension sections 26) of the entire structure body 20 and the subsidiary cellular structure 20E. Moreover, the cushion (foam) material is filled into the meshes 23 (or solid cells 25)

of the structure body 20 to integrally bond with the strip members 21, 22 (or the walls 24 and extension sections 26) to form a concrete structure. This synergistically increases the structural strength of the safety helmet, whereby the safety helmet can resist against much greater external impact.

In comparison with the conventional helmet, the present invention has the following advantages:

1. The longitudinal and transverse strip members 21, 22 or the walls 24 of the structure body 20 define multiple meshes 23 or solid cells 25 arranged in an array. The foam material is filled into the meshes 23 or the solid cells 25 to integrally bond with the strip members 21, 22 or the walls 24 to form a concrete reinforcement structure. The solid cells 25 provide a special impact collapsible section inside the helmet body 10 to enhance the impact absorption ability thereof. The structure body 20 is integrally formed with a subsidiary section 20C integrally connected with the helmet body 10 and the plastic shell 30. The plastic shell 30, the foam filling material (or the helmet body 10) and the structure body 20 and the subsidiary cellular structure 20E are integrated with each other to form a complex reinforcement structure with better buffering effect and impact absorption ability. The structure of the present invention is different from the conventional helmet. Also, the present invention transmits external impact force in a different manner and is able to uniformly spread the force. This overcomes the shortcoming existing in the conventional helmet.
2. The helmet body 10 is formed of cushion (foam) material and combined with the structure body 20, whereby the external impact force can be effectively spread to respective parts of the foam filling body (or the helmet body). Accordingly, when the foam filling body is impacted by an external force, the external force will not concentrate to break the helmet body. This eliminates the problem existing in the conventional helmet.
3. Especially, the helmet body 10 and the structure body 20 and the subsidiary cellular structure 20E are integrated with each other to form a complex reinforcement structure, which is easier to manufacture and has higher structural strength and higher security and lower ratio of defective products. The present invention is able to bear greater external or lateral impact pressure. In practice, the present invention can be manufactured with thinner thickness and lighter weight to widen the application range.

In conclusion, the reinforcement structure of safety helmet of the present invention and the manufacturing method thereof are advantageous over the conventional helmet in structure and function.

The above embodiments are only used to illustrate the present invention, not intended to limit the scope thereof. Many modifications of the above embodiments can be made without departing from the spirit of the present invention.

What is claimed is:

1. A reinforcement structure of a safety helmet, comprising:
    a helmet body formed of a cushion foam material; and
    a structure body assembled with the helmet body, the helmet body having a top section and a peripheral section, the structure body being defined by a first section and a second section, wherein the second section is connected to the first section, and the first section corresponds to the top section and the second section corresponds to the peripheral section of the helmet body, the structure body having multiple longitudinal and transverse strip members integrally joined together to define a substantially domed contour, the longitudinal and transverse strip members forming an array texture and defining therebetween multiple geometric meshes, the cushion foam material being passed through the meshes, whereby the helmet body bonds with and encloses the first and second sections of the structure body, wherein the second section extends to a subsidiary section integrally formed therewith, the cushion foam material being filled over the subsidiary section;
    wherein the structure body is positioned on an inner face of the helmet body as an innermost layer thereof.

2. The reinforcement structure of the safety helmet as claimed in claim 1, wherein lower edges of the second section are connected with each other to form the subsidiary section, whereby a bottom of the helmet body is enclosed in the subsidiary section to form an integrated structure, and a plastic shell and the subsidiary section are bonded with each other.

3. The reinforcement structure of the safety helmet as claimed in claim 2, wherein the subsidiary section extends along the lower edges of the second section in an annular form and the subsidiary section has a U-shaped cross section.

4. The reinforcement structure of the safety helmet as claimed in claim 1, wherein the arrangement density of the longitudinal strip members and transverse strip members is changeable.

5. The reinforcement structure of the safety helmet as claimed in claim 2, wherein the arrangement density of the longitudinal strip members and transverse strip members is changeable.

6. The reinforcement structure of the safety helmet as claimed in claim 3, wherein the arrangement density of the longitudinal strip members and transverse strip members is changeable.

7. The reinforcement structure of the safety helmet as claimed in claim 1, wherein a plastic shell is assembled with the helmet body and the structure body, the plastic shell enclosing the helmet body to together form a helmet assembly, the cushion foam material being injected into a molding module to form the helmet body, the molding module including a female mold, a male mold and a cavity defined between the female mold and the male mold, the cavity serving as a space in which the structure body is received and fixed and the cushion foam material is injected.

8. The reinforcement structure of the safety helmet as claimed in claim 2, wherein a plastic shell is assembled with the helmet body and the structure body, the plastic shell enclosing the helmet body to together form a helmet assembly, the cushion foam material being injected into a molding module to form the helmet body, the molding module including a female mold, a male mold and a cavity defined between the female mold and the male mold, the cavity serving as a space in which the structure body is received and fixed and the cushion foam material is injected.

9. The reinforcement structure of the safety helmet as claimed in claim 3, wherein a plastic shell is assembled with the helmet body and the structure body, the plastic shell enclosing the helmet body to together form a helmet assembly, the cushion foam material being injected into a molding module to form the helmet body, the molding module including a female mold, a male mold and a cavity defined between the female mold and the male mold, the cavity serving as a space in which the structure body is received and fixed and the cushion foam material is injected.

10. The reinforcement structure of the safety helmet as claimed in claim 4, wherein a plastic shell is assembled with the helmet body and the structure body, the plastic shell enclosing the helmet body to together form a helmet assembly, the cushion foam material being injected into a molding module to form the helmet body, the molding module including a female mold, a male mold and a cavity defined between the female mold and the male mold, the cavity serving as a space in which the structure body is received and fixed and the cushion foam material is injected.

11. The reinforcement structure of the safety helmet as claimed in claim 5, wherein a plastic shell is assembled with the helmet body and the structure body, the plastic shell enclosing the helmet body to together form a helmet assembly, the cushion foam material being injected into a molding module to form the helmet body, the molding module including a female mold, a male mold and a cavity defined between the female mold and the male mold, the cavity serving as a space in which the structure body is received and fixed and the cushion foam material is injected.

12. The reinforcement structure of the safety helmet as claimed in claim 6, wherein a plastic shell is assembled with the helmet body and the structure body, the plastic shell enclosing the helmet body to together form a helmet assembly, the cushion foam material being injected into a molding module to form the helmet body, the molding module including a female mold, a male mold and a cavity defined between the female mold and the male mold, the cavity serving as a space in which the structure body is received and fixed and the cushion foam material is injected.

13. The reinforcement structure of the safety helmet as claimed in claim 3, wherein the subsidiary section is provided with a fastening strap or fastening member.

14. The reinforcement structure of the safety helmet as claimed in claim 7, wherein the plastic shell is formed with vents.

15. The reinforcement structure of the safety helmet as claimed in claim 1, wherein the structure body is selectively formed of plastic material with a helmet-shaped mesh texture.

16. The reinforcement structure of the safety helmet as claimed in claim 6, wherein the structure body is selectively formed of plastic material with a helmet-shaped mesh texture.

17. The reinforcement structure of the safety helmet as claimed in claim 9, wherein the structure body is selectively formed of plastic material with a helmet-shaped mesh texture.

\* \* \* \* \*